United States Patent [19]

Watson et al.

[11] 4,045,136

[45] Aug. 30, 1977

[54] CONTROL SYSTEM FOR PHOTOGRAPHIC FILM PRINTERS

[75] Inventors: Charles J. Watson, Elgin; Larry L. Langrehr, Chicago, both of Ill.

[73] Assignee: Bell & Howell Company, Chicago, Ill.

[21] Appl. No.: 605,008

[22] Filed: Aug. 15, 1975

[51] Int. Cl.$^2$ ............................................. G03B 27/78
[52] U.S. Cl. ........................................ 355/83; 355/88
[58] Field of Search ................. 55/83, 35, 88; 323/56; 321/27 R; 307/151, 155, 156, 149; 318/560

[56] References Cited

U.S. PATENT DOCUMENTS

| | | | |
|---|---|---|---|
| 3,476,477 | 11/1969 | Balint et al. | 355/83 X |
| 3,492,071 | 1/1970 | Limnios et al. | 355/83 |
| 3,502,409 | 3/1970 | Balint et al. | 355/88 X |
| 3,519,347 | 7/1970 | Bowker et al. | 355/88 |
| 3,533,693 | 10/1970 | Balint | 355/88 X |
| 3,586,438 | 6/1971 | Gyori | 355/88 X |
| 3,716,299 | 2/1973 | Balint | 355/83 |
| 3,768,001 | 10/1973 | Thorborg | 321/27 R |
| 3,820,002 | 6/1974 | Wildi | 321/27 R X |

*Primary Examiner*—Richard A. Wintercorn

*Attorney, Agent, or Firm*—John R. Hoffman; Robert J. Schneider; Roger M. Fitz-Gerald

[57] ABSTRACT

A control unit for a photographic film printer for printing motion picture film onto raw stock from a master preprint film. The operation of various functions of the printer such as color changes, fades, and the like, are controlled in accordance with a control tape bearing information for the control of the various components. Various cue signals indicating where the desired controls are to be effective during the printing process are provided by a notch or RF patch system, a separate frame counting system utilizing a separate film address information tape, or an integral frame counting cuing system wherein the film address information is provided on the same control tape with the control information. Frame count cuing is achieved by counting frame numbers of the preprint film from a predetermined reference to thereby assign a position address to each film frame whereby the coincidents between the film address of the master frame and the frame address provided by the tape provides a command signal to release control data to the various printer controls. Logic means is provided to achieve printing and fading capabilities in both forward and reverse directions.

31 Claims, 11 Drawing Figures

CONTROL SYSTEM FOR PHOTOGRAPHIC FILM PRINTERS

BACKGROUND OF THE INVENTION

1. Field of the Invention

This invention relates generally to control units for photographic film printers and particularly to an improved printer control unit capable of operating several of the most common commercially available printing modes.

2. Description of the Prior Art

Photographic film printers are widely used in the motion picture industry for the improvement of photographed scenes with respect to image density, composition, color balance, fading, and other special effects.

Typically, optical changes such as color and light intensity and fading or special effect information is provided on a coded control tape. The tape is preprinted with rows of control data to be sequentially read by an appropriate tape reader to accomplish the desired printer operation at the film frame line at the beginning of a particular scene. Therefore, a cue or cue signal is necessary to initiate the actuation of the printer operations.

Two cuing systems, notch and RF patch, are commonly employed to provide cues to the printer. The notches or RF patches are applied directly to the preprint film so that the appropriate cue is generated as the notch or patch is sensed. However, both the notch and patch systems have not proven entirely satisfactory, particularly in view of the high speed at which modern printers operate and because of the required physical handling to prepare the master preprint film.

Therefore, a number of automatic cuing systems or frame counting cuers have been developed which use a second coded tape carrying cue address information to provide the cue signals. Automatic cuing thus obviates the need to physically alter the master preprint film in order to provide cue signals to the printer. In frame count cuing systems, the movement of the film through the printer is continuously monitored. Control information concerning light changes and the like is transferred to the printer. This is done upon the occurrence of a predetermined relationship between the monitoring counter and film address information provided by the cuing tape.

Other devices have also been provided in an attempt to combine both the control information and film address information on a single control tape. However, such approaches have not proved completely satisfactory from a standpoint of reliability, speed and versatility. Moreover, none of the above systems are compatible with one another such that a user can employ new devices utilizing advanced techniques without losing the use of existing equipment, control tapes and the like

SUMMARY OF THE INVENTION

An object of the present invention is to provide a new and improved, more versatile photographic film printer control unit.

Another object of the present invention is to provide a printer control unit capable of operating with existing notch, RF patch and frame count cuing systems for initiating various printer controls.

A further object of the present invention is to provide a printer control unit using a single control element bearing information relating to various printer controls and frame count cuing information on a single tape.

Another object of the present invention is to provide a printer control unit having logic means to provide a bidirectional mode of operation including fading capability and other special effects in a reverse mode.

In accordance with the above objects and advantages, the present invention contemplates the provision of a versatile control system for the operation of a photographic film printer. The control system includes information input means, such as a tape reader, or the like, for reading a coded control element. The control element bears control data information for the various printer controls. The control element may also include cuing frame address information to provide a command signal at the occurrence of a particular frame for initiating the actuation of the variable controls in accordance with the control data information. The control system includes a control data memory for storing the control information and a cue data memory for storing the frame cue address information as well as an identification means for determining whether the control element contains only control information or both control information and cuing frame address information. The control unit also includes enabling means providing an output command signal at a predetermined position of the preprint film in the printer to selectively enable actuation of the printer variable control means in accordance with the control information stored in the control data memory. As stated above, the cuing information may be provided by a notch, an RF patch cuing system, an external frame count cuer having a separate control element bearing cuing frame address information, or from a composite tape bearing both control and cuing frame address information.

The printer control unit also provides for a reverse operation logic system for conditioning the unit with film address information when operating in a reverse mode. Complete bi-directional operation is provided and includes the capability of producing fades when operating in the reverse direction from the same control element.

Other objects, features and advantages of the invention will be apparent from the following detailed description taken in connection with the accompanying drawings.

DESCRIPTION OF THE PREFERRED EMBODIMENT

Figure 1:
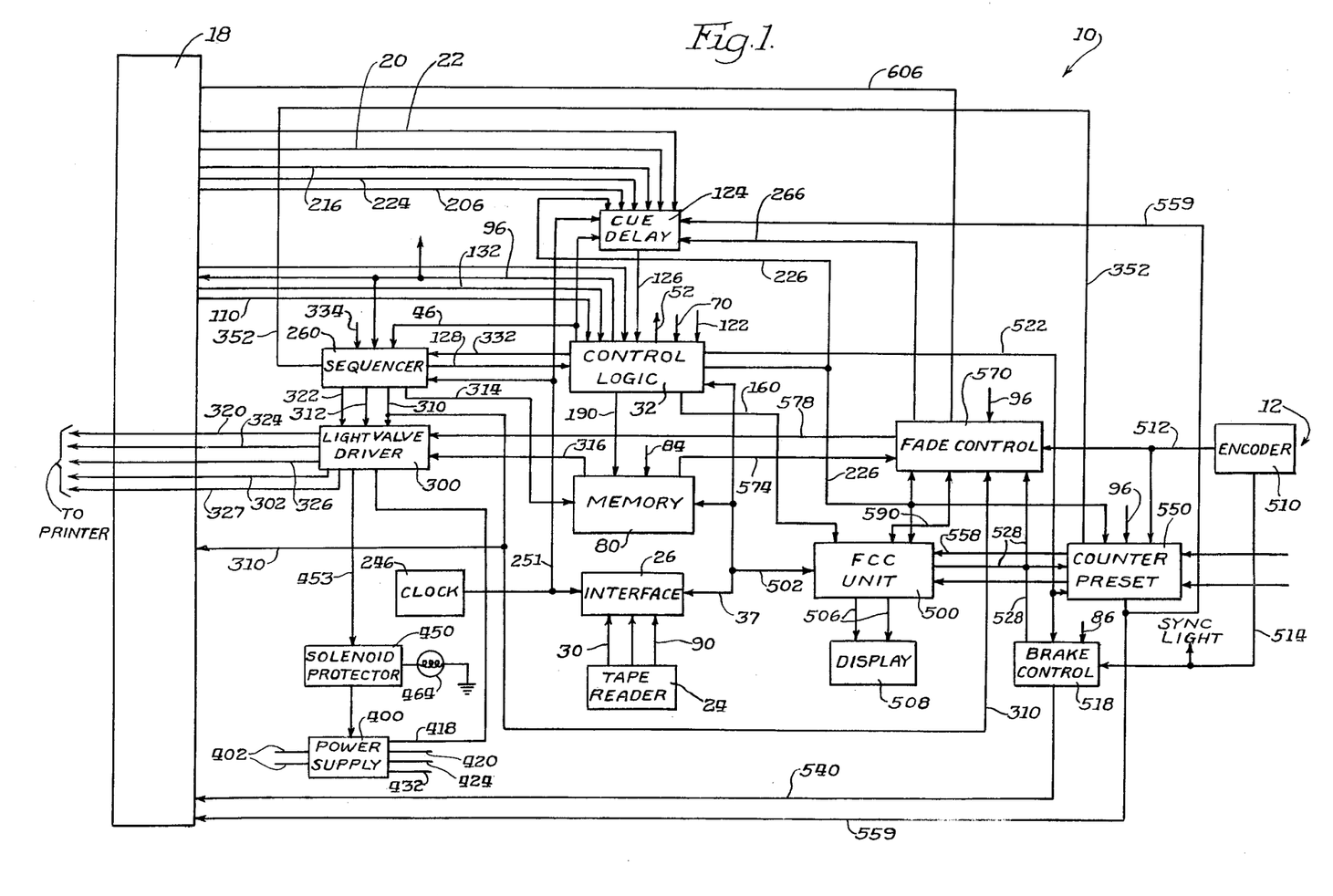
FIG. 1 is an overall schematic diagram of the electronic components of the printer control unit of the present invention.

The overall block diagram for the printer control unit contemplated by the present invention is shown in FIG. 1 and is generally designated 10. The printer control unit 10 is adapted to operate a photographic film printer having variable control means, such as a variable color content light source, for achieving color balance corrections, and an exposure control device for varying the intensity of the printing beam to produce fades, lap dissolves and other special effects as well as a number of other functions, as will be described in detail hereinafter. The control unit 10 is adapted to operate with three types of cuing signals to initiate certain functions of the printer, such as color changes, fades, or the like.

One type of cuing system is the notch or RF patch system in which actual notches or small patches on a master preprint film generate a cue signal to the printer control unit. This is a conventional type of cuing system and currently the mode widely used by the motion picture industry.

A second type of cuing system contemplates the use of an external frame count cuer such as that shown in copending application Ser. No. 509,590, filed Sept. 26, 1974 and assigned to the assignee of the present invention. The disclosure of that application is incorporated by reference herein to aid in the understanding and explanation of this type of system. Briefly, as shown therein, a frame count cuing system continuously monitors a quantity of film as it is passed through the printer and provides an output cue signal to actuate the variable control means of the printer. Scene length information or frame address information is provided to the external frame count cuer by a separate frame address information tape read by the frame count cuer. When the frame count cuer detects the occurrence of a particular frame or the end of a scene length, it generates a cue signal. As shown in the incorporated reference, control data for the printer is provided on a separate control data tape.

The present invention is adapted to operate with either of the above-mentioned cuing systems as well as a third system in which a modified frame count cuer, generally designated 12, is provided internally in the righthand portion of FIG. 1. In this case, control data information relating to light changes, color changes and the like is provided on a single composite tape also including frame cuing address information. The printer control unit 10 includes discriminating means, generally designated 14, at the top of FIG. 2, to determine whether or not a composite tape or a tape containing only control data information has been provided and conditions the printer control unit in accordance therewith.

Referring again to FIG. 1, the printer control unit 10 is connected to a photographic film printer by an optically isolated interface 18. The interface 18 comprises a plurality of light emitting diodes and light sensitive transistors for transferring signals between the control unit 10 and a printer or vice versa without requiring any direct electrical connections. This isolation system thusly substantially eliminates any electrical impulses or ambient noise from being transferred from the printer to the control unit 10. When used with either an RF patch, notch, or external frame count cuing system, the printer control unit 10 of the present invention performs, basically, the same function as a conventional printer control unit. A notch or RF patch cue is provided to the printer control unit 10 along input line 20 while a cuing signal from an external frame count cuing system is provided to the control unit 10 along an input line 22.

For simplicity, the printer control unit 10 described herein refers to the embodiment containing an internal or integral frame count cuing system 12 with the understanding that this is not a necessary element since the cue signals may be provided by an external frame count cuing system. However, the embodiment shown, including the internal frame count cuing system 12, will also operate with an external frame count cuing system. This arrangement enables the user to use both a double tape system, using an external frame count cuer using a film frame address information tape and a second tape carrying control data which may already be on hand from printing prior movies. However, for any movies which may be printed in the future, a composite tape may be used, thereby enabling the internal frame count cuer 12 to provide the cue signals.

More particularly, a conventional tape reader 24 is provided for reading the control element which may be a prepunched, coded paper tape. Since the control system 10 is adapted for both a two tape system or a composite tape system, it is necessary that the unit be able to discriminate between the tapes. In one format provided, the composite tape is identified by a single hole punch in the fourth channel which identifies it as such. When using a double tape system, the control data tape is read by the tape reader 24 and the absence of the single hole punch in the fourth channel identifies it as a control data tape only. In this case, a separate tape bearing film address information is provided for the external frame count cuer and includes a hole punch in both the third and fourth channel which identifies it as a film address information tape. The reader is connected to a reader interface 26 which receives information directly from the reader. Eight channels of information are provided for each row on the tape to the reader interface by line 30 from the tape reader. This eight bit information is transferred through line 31 to a control logic unit 32 for processing.

Figure 2:
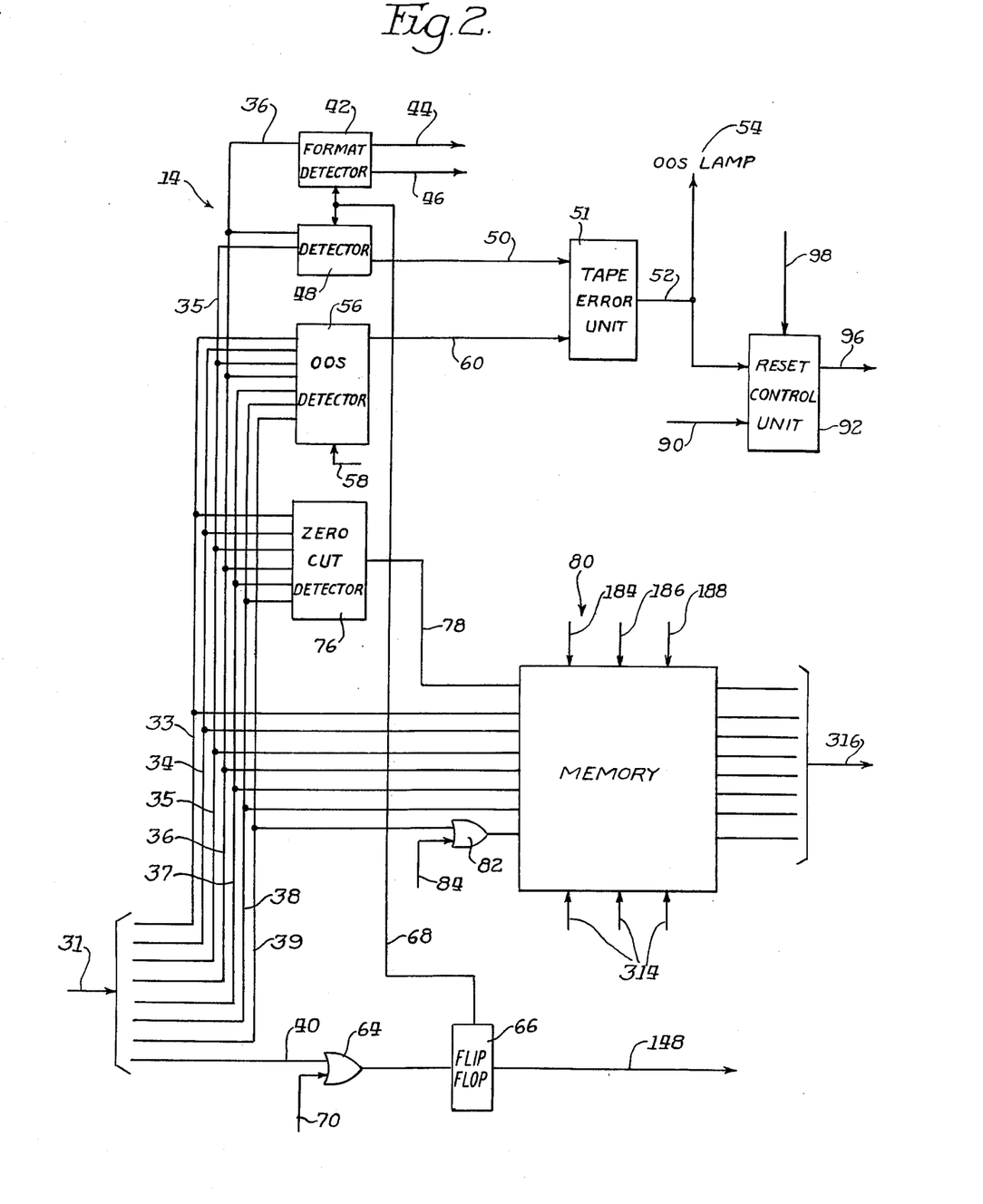
FIG. 2 is a schematic block diagram, in greater detail, showing the memory and a portion of the control logic unit as illustrated in FIG. 1.

Referring now to FIG. 2, line 31 from the interface includes, among others, eight lines 33 through 40 representative of information contained in channels one through eight, respectively, of either a control data tape or a composite tape. Line 36 associated with the fourth channel is connected to a format detector 42 which, if a hole is present on the tape, line 44 is valid for a composite tape in the reader. If there is no single hole punch in the fourth channel, line 46 is valid to indicate that the tape contains only control data information. The output from lines 44 and 46 condition the control unit 10 for operating in a composite tape mode or a control data tape mode. On the other hand, if information is read on both channel three and four, this information is carried by lines 35 and 36 to a second detector 48 which identifies the tape as a frame address information tape and outputs a signal along line 50 to a tape error unit 51 which outputs a signal along line 52 which lights an out-of-sequence lamp 54.

An out-of-sequence detector 56 also is connected to lines 33 through 39 bearing information from channels one through seven and, if enabled, information in any one of these lines will indicate, by a signal on line 58, that the tape is out of sequence thereby signalling the tape error unit 51, along line 60, which again lights the out-of-sequence lamp 54.

Finally, line 40, bearing information from the eighth channel is connected through an OR-gate 64 to a flip-flop 66 which identifies the beginning of a control data tape. Flip-flop 66 outputs a signal along line 68 to both the format detector 42 and the second detector 48 to disable those detectors, since subsequent information with respect to control data will often contain information in the third and fourth column which should not indicate an out-of-sequence or identify a particular tape. A second input line 70 connected to a manual start button (not shown) operates the flip-flop 66 in the same manner. Lines 33 through 38 also are connected to a zero cut detector 76 which, when all of the columns 1 through 6 are devoid of information, outputs a signal along line 78 to the memory unit, generally designated 80, indicating that all of the light valves of the printer should be completely closed. All of the data on channels 1 through 7 of the tape also are transferred to the memory unit along lines 33 through 39. Line 39 is connected to an OR-gate 82 bearing information for controlling the fader or other exposure control device on the printer. The OR-gate 82 includes a second input line 84 which permits activation of a manual fade.

The tape reader 24 includes a lid switch which is activated when the lid portion of the reader is lifted to insert a tape. The lid switch outputs along line 90 to a reset control 92 to the top right of FIG. 2 which resets the components of the control unit 10 by an output on line 96. At any time when the lid switch on the tape reader is open, line 96 is valid to reset the entire unit. Additionally, line 98 into the reset control 92 provides an input signal thereto if an external frame count cuing system indicates that the frame address information tape therein is out of sequence. The generation of this external frame count cuer out of sequence signal can be more clearly understood by referring to the above-mentioned copending application. Additionally, an out-of-sequence signal along line 52 from the tape error unit 51 also will reset the control unit.

Figure 3:
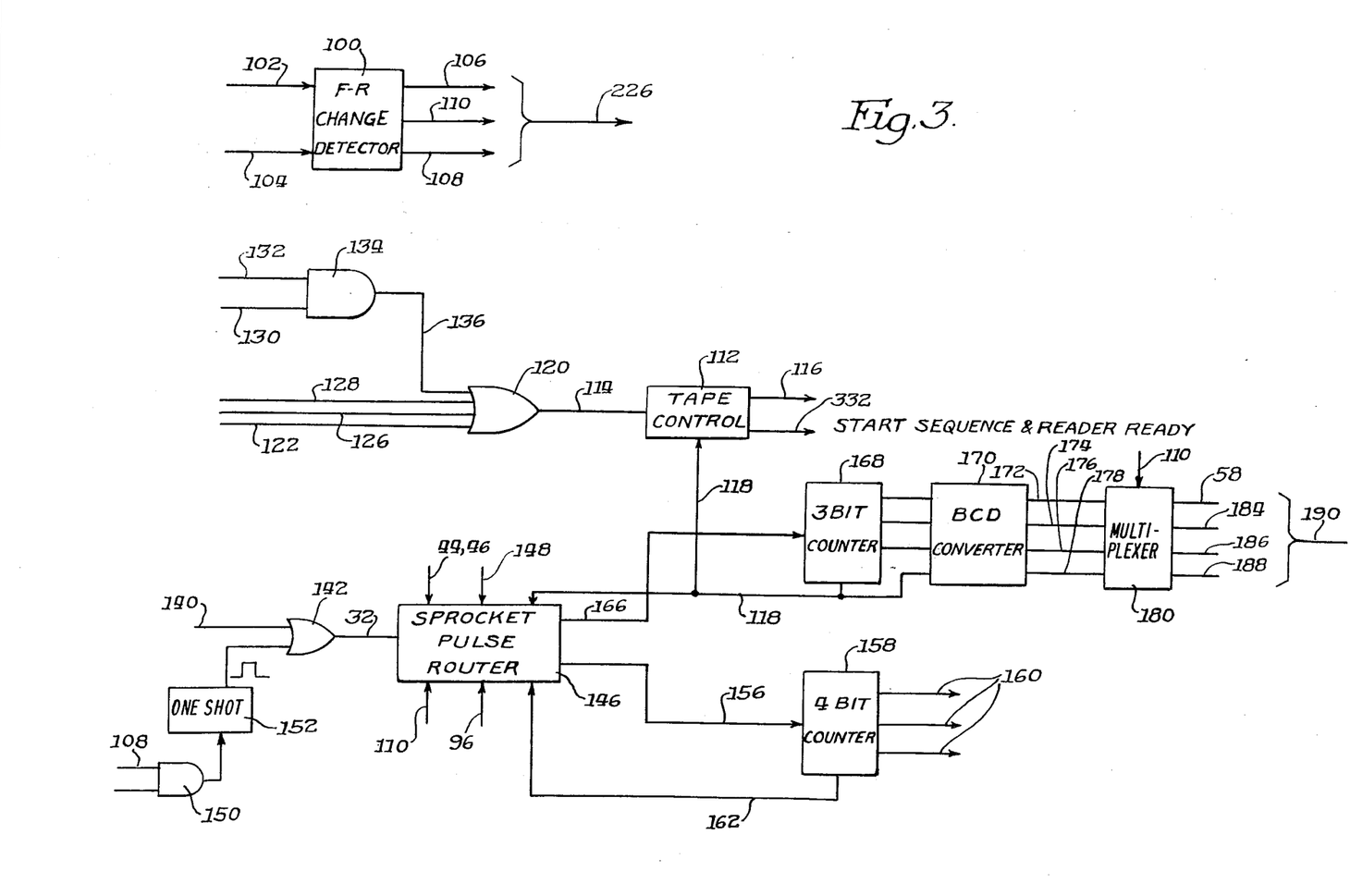
FIG. 3 is a schematic block diagram, in greater detail, of the remainder of the control logic unit as illustrated in FIG. 1.

The remaining portion of the control logic unit 36 is shown in FIG. 3. The control logic unit of FIG. 3 includes, at the top, a forward-reverse change detector 100 which receives an input along line 102 when the printer is in a forward mode and along line 104 when the printer is in a reverse mode. The detector 100 outputs a signal along line 106 when in the forward mode and along line 108 when in the reverse mode and also provides a pulse along line 110 when the printer is switched between the forward mode and reverse mode or vice versa.

Figure 5:
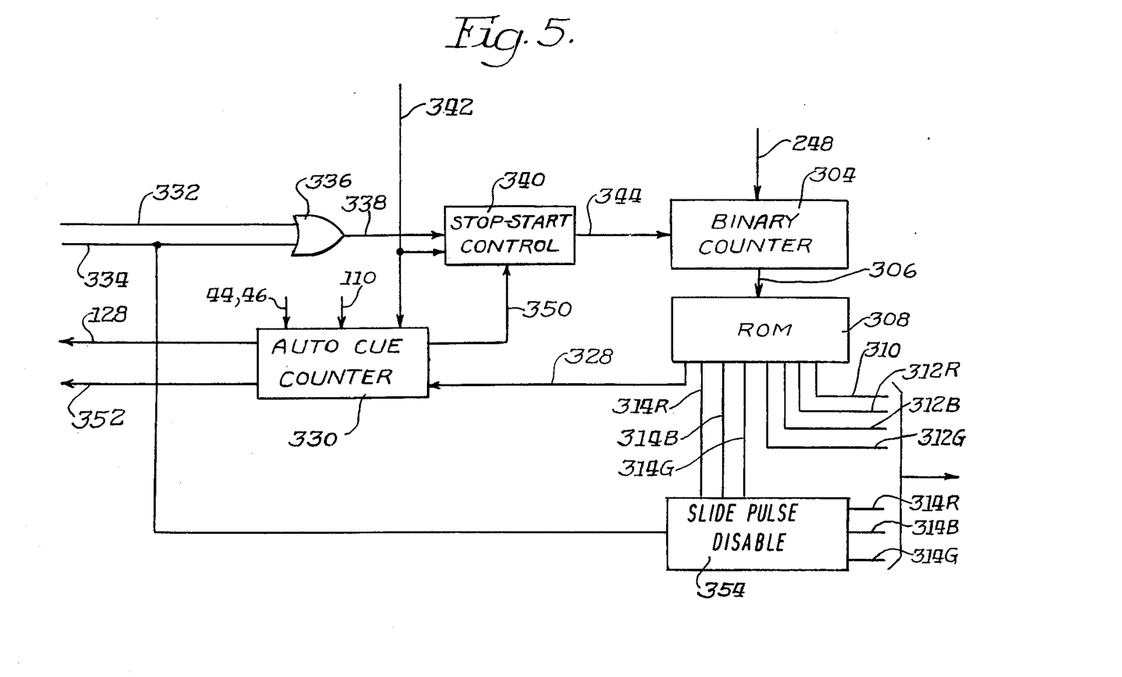
FIG. 5 is a schematic block diagram, in greater detail, of the sequencing board elements as illustrated in FIG. 1.

A tape control unit 112 is provided to control the operation of the tape reader 24. An input signal along line 114 will start the tape control which outputs a reader step command along line 116 connected to the reader. The tape control unit 112 will continue stepping the reader until a signal along line 118 stops the reader. Four possible input signals to an OR-gate 120 will provide a start command signal to the tape control unit 112. These four signals include a manual cue signal on line 122, a cue signal from a cue delay unit 124, described below, along line 126, or an automatic cue signal along line 128 from a sequencer (described with respect to FIG. 5) to provide a double cue at machine startup. Additionally, a combination signal provided along line 130, when the fader is in the open position combined with an auto-start signal along line 132 through an AND-gate 134, will output a signal along line 136 to the OR-gate 120. Any of the above described four signals will initiate stepping of the tape reader through the tape control unit 112.

The tape reader 24 provides an output pulse for each sprocket hole along line 140 to an OR-gate 142. The OR-gate is connected by line 31 to a sprocket pulse router 146. The sprocket pulse router is conditioned by the output signal along line 44 or 46 indicating either a composite tape or a control tape and a signal along line 148 from the flip-flop 66 indicating that an eight hole has been recognized at the beginning of a tape. Additionally, a reset signal along line 96 will reset the sprocket pulse router, as well as a signal along line 110 indicating a switch in mode from forward to reverse or vice versa. When in the reverse mode, if the control unit is reset, signals along line 108 and 96 through an AND-gate 150 provide a signal to a one shot 152 which provides a single pulse through the OR-gate 142 to the sprocket pulse router.

The function of the sprocket pulse router is to provide output enabling strobe signals to the memory 80 to correctly route the incoming information. For example, when using a composite tape, the seven lines following the eight hole start line contain film frame address information which must be transferred to the internal frame count cuer 12. To this end, the first eight sprocket pulses are transferred via line 156 to a four bit binary coded decimal counter 158 which provides binary coded frame count cuer strobes along lines 160 to the internal frame count cuer 12. Once the eighth row of information is read, an output signal along line 162 from the counter 158 directs the sprocket pulse router to route the remaining information through line 166 to a three bit counter 168. Once the fourth or last row of information is read, it is transferred to a binary to decimal decoder 170 for a decimal output along lines 172, 174, 176 and 178. When the last bit of information is received, an output signal along line 118 to the tape control unit stops the tape reader and resets the sprocket pulse router. The pulses along lines 172 through 178 are connected to a multiplexor 180 to provide control data strobes out along lines 58, 184, 186 and 188, represented by a combined line 190 between the control logic unit 36 and the memory 80 (FIG. 1). These control data strobes are used to identify which row of information is to control a particular color light valve on the printer. When operating in reverse mode, the tape reader will be reading in the reverse direction. Therefore, an output signal along line 110 indicating a change in direction, causes the multiplexor to flip the strobe information in exactly the opposite order to maintain compatability with the tape format and light valve wiring. Line 58, as previously described, is connected directly to the out-of-sequence detector 56 for enablement only in step one of each color block on the tape. The remaining color data strobe lines 184, 186 and 188 are shown connected to the top of the memory unit 80 for properly strobing the output therefrom.

Conventional devices providing for color change correction often contain dichrolic systems which separate a white beam into a plurality of monochromatic beams and then re-adds the monochromatic beams for a combined printing beam. Each of the monochromatic light beams is individually regulated by a light valve. A suitable light source for a photographic film printer is illustrated in U.S. Pat. No. 3,502,409, assigned to the assignee of the present invention. Normally, three light valves are provided, one for each of the red, blue and green primary color light beams within the controlled light system. The valves include a bar-type adder memory which preferably is preset with color change information prior to the occurrence of the particular frame in which the color change is desired to occur. Therefore, upon the occurrence of a cue signal, the information stored by the light valve is immediately transferred to the vanes of the light valve for changing the lighting values and the printing beam color composition.

It also is desirable to provide a variable delay within the system between the time a cue signal is received and the actual energization of the light valves to permit the execution of a color change exactly on a frame line. To this end, the cue delay unit 124 enables the operator to delay the execution of a light change after receiving a cue signal from between 0 and 999 milliseconds. The "cue delay unit" 124 is shown in more detail in FIG. 4 and includes a set of binary coded decimal switches 200 which enable the operator to preset a cue delay for any value between 0 and 999 milliseconds. The switches 200 are connected by lines 202 to a similar number of random access memory units or RAMS 204. The RAMS 204 are capable of storing sixteen, twelve bit words supplied by the switches 200. Each word or cue delay is adapted for a specific film printing speed and for both forward and reverse directions. The RAMS are conditioned by input signals to receive and store a cue delay related to a specific film speed, direction and type of cue. More particularly, line 206 conditions the memory to store a cue delay for a printing speed of 60 feet per minute or 120 feet per minute as selected by a hard wire jumper 208 connected to line 210 or 212 for 60 or 120 feet per minute operation respectively. Likewise, a signal along line 216 conditions the memory to store a time delay for either operation at 480 feet per minute when a second hard wire jumper 218 is connected to aline 220 or for the cue signal mode along line 222 from an external frame count cuing system as previously described. When using an internal frame count cuing system, line 222 selects the appropriate memory for the cue delay desired for the internal frame count cuing system as will be described in detail below.

Figure 4:
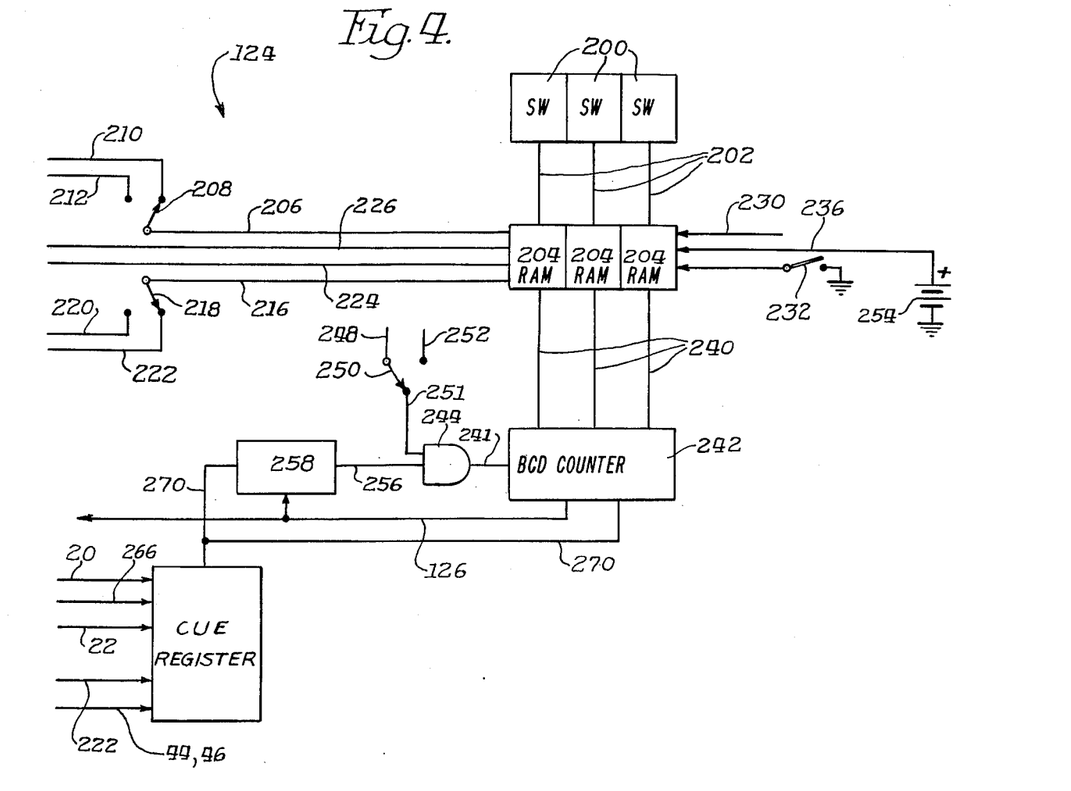
FIG. 4 is a schematic block diagram, in greater detail, showing the cue delay component as illustrated in FIG. 1.

An additional line 224 selects a memory section for a printing at 240 feet per minute and line 226 provides a signal to the RAMS when the printer is operated in the reverse mode to provide an additional cue delay for all of the above types when operating the printer in reverse.

During initial installation of the machine, the installer sets the machine in a print-start mode which signals, via line 230, to enable the memory 204. The operator then sequentially sets the appropriate switches for the various speeds, direction and FCC operation to condition the memory to accept a cue delay for the various speeds and operational modes. Each cue delay is sequentially set in the BCD switches 200 and loaded into the appropriate memory by manually depressing the load switch 232. Random access memory units of this type are volatile such that each time the machine is shut down, unless a provision is made, the memory will lose the information stored therein. Therefore, a 5.4 volt battery 234 is connected by line 236 to the memory units 204 to store the information therein in a nonvolatile state. This battery 234 constantly energizes the storage units 204 to hold the information therein and is designed to last approximately for a two-year period.

During operation of the printer, an input signal along lines 206, 224, 216, in conjunction with line 226, determines which of the random access memory cells or words will be read by the control unit. The appropriate memory cell, selected as above, outputs the binary coded time delay along lines 240 to a 12 bit binary coded decimal counter 242. The counter 242 sequentially counts down upon signals from line 241 connected to an AND-gate 244. The AND-gate 244 is connected to a clock 246 (FIG. 1) which can output in either a 1-kilo hertz or 2-kilo hertz mode. The 1-kilo hertz signal is provided by line 248 through a toggle switch 250 by line 251 to one end of the AND-gate 244, similarly the 2-kilo hertz signal along line 252 could be connected to the AND-gate 244. When using the 1-kilo hertz clock mode, a cue delay may be provided from between 0 and 999 milliseconds, while using a 2-kilo hertz mode provides for the ability to program a cue delay between 0 and 499 milliseconds. The AND-gate 244 is connected by a line 256 to an enabling flip-flop 258 which when anded to the clock pulse operate the counter in a down mode. As the counter begins counting in a down mode and reaches 0, a borrow signal is output along line 126 which is then the delay cue signal output which is provided to the control logic unit to step the reader and actuate the light valves. This actuation of the light valves is described in greater detail below with respect to a sequencing board 260. The delay cue signal along line 126 also resets the flip-flop 258 to disable the counter 242.

A plurality of cue signals will enable the AND-gate 244 to begin the counter 242 to count down and provide a delayed cue signal along line 126. These cue signals may either be a signal from a notch or patch sensor along line 20, a cue signal from an external frame count cuer along line 22 or a cue signal from an internal frame count cuer along line 266 from the internal frame count cuer 12 (FIG. 1). Lines 20, 22 and 266 are connected to a cue register 268 (FIG. 4). Additionally, lines 222 and 44 or 46 to the cue register, identifying use of either an external frame count cuer or an internal frame count cuer with a composite tape, select the appropriate cue signal from lines 20, 22 or 266 to provide an output cue signal along line 270 to the enabling flip-flop 258 which begins the counter. As previously described when the counter reaches 0 a borrow output signal along line 26 activates the light change as will be described in detail below. Each output cue signal along line 270 is also fed directly to the counter 242 to load the information therein from the random access memory units 204.

In some prior color additive light systems, the solenoids which actuate the light valve vanes were simultaneously activated for all of the light valves which caused considerable power drain on the power supply. The current embodiment contemplates a sequential activation of the color light valves to thereby spread the power requirement over a longer period of time. The sequencing unit 260 which performs this function is illustrated in more detail in FIG. 5, according to the chart of FIG. 6. A light valve driver 300 is connected to the sequencer 260 and outputs a vane signal, as will be described in detail below, along line 302 to the light valves to cause the information stored in the bar-adder memory to be transferred to the vanes. This begins the cycle for storing color data information in a light valve bar-adder memory for the subsequent scene. After the information has been transferred to the light valve vanes, an unlatch signal is provided to unlock the bar-adder memory which is then prepared to receive a slide signal which sets the bar-adder slides with the color information for the subsequent scene.

The sequential operation and occurrence of the above signals is clocked by the 1-kilo hertz clock 246. The 1-kilo hertz clock signal along line 248 is divided by two to provide a two millisecond clock pulse count to a five stage binary counter 304. The binary counter 304 counts from 0 to 128 milliseconds with the information being transferred via line 306 to a 64, eight bit word read only memory 308. Referring to the chart (FIG. 6), the read only memory then outputs a vane signal on on line 310 for twenty-eight milliseconds beginning at the two millisecond clock pulse, This vane signal, as described above, causes the bar-adder memory to transfer the mechanically stored informaton to the vanes. Subsequently, at 48 milliseconds, an unlatch signal to the red light valve memory is provided for 10 milliseconds by line 312R. Simultaneously, a slide strobe pulse is provided by line 314R to the memory 80 to transfer the color data stored therein from the control tape for the red light valve through line 316 to the light valve driver 300 which then outputs red light valve data on line 320 to the bar-adder memory of the red light valve. The strobe signal on line 314R is simultaneously provided to the light valve driver by line 322 to enable transfer of the data by the light valve driver to the light valve. Note, according to the chart of FIG. 6, that the slide signal extends for a period of twenty milliseconds thus overlapping the red unlatch signal by ten seconds to prevent the data from being lost. At the termination of the red slide signal at 68 milliseconds a green light valve unlatch signal is provided by a second of the lines 312G to unlatch the green light valve memory. A green slide signal along line 314G then strobes the green color data from the memory 80 and transfers it to line 316 to the light valve driver which through line 324 inputs the color data to the green light valve memory. Again, the slide signal extends for twenty milliseconds to overlap the unlatch signal to provide assured storage of the green color data in the green light valve. Likewise, the blue color data information is transferred to the blue light valve by line 326 after a similar unlatch signal.

Figure 6:
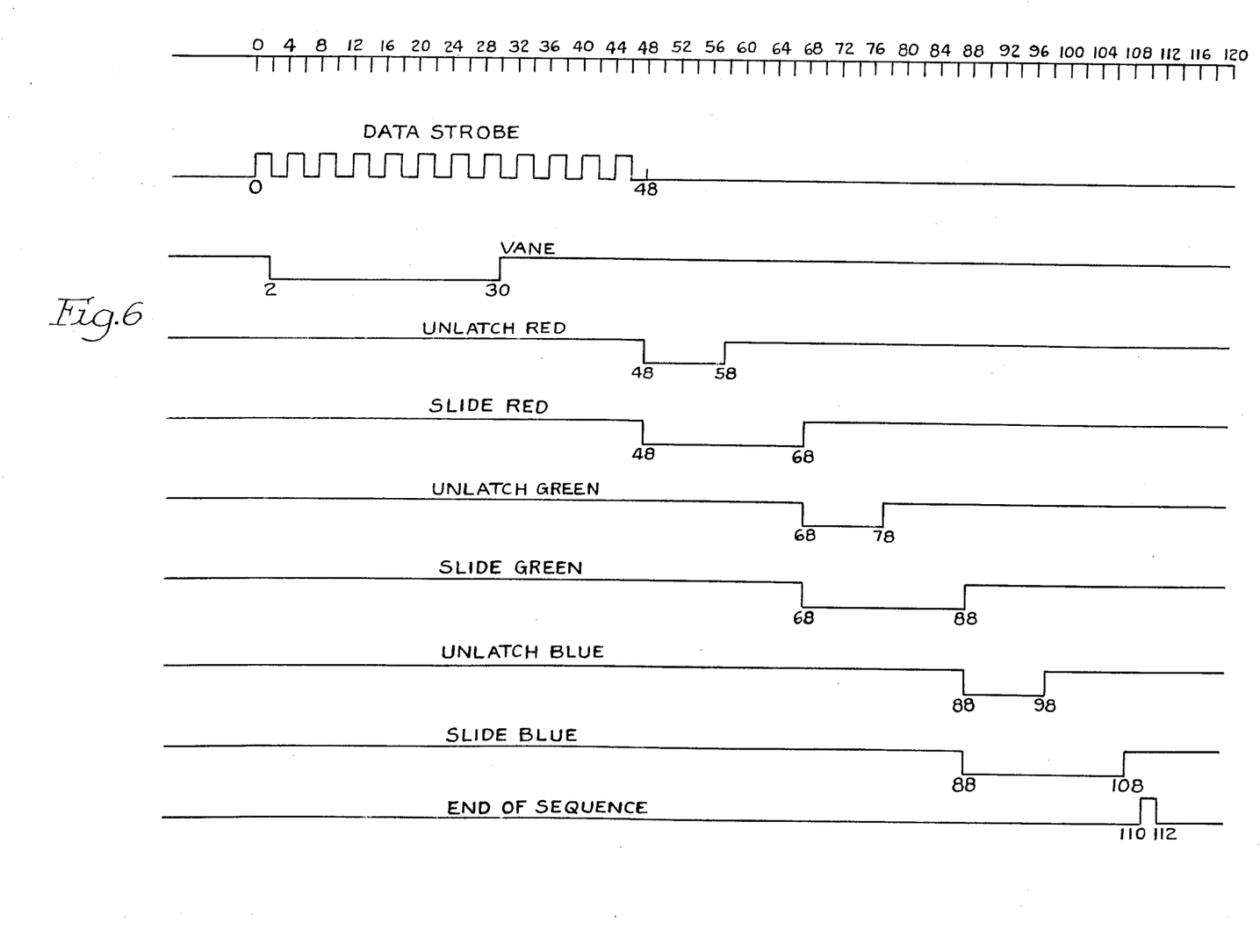
FIG. 6 is a timing diagram showing the sequential occurrence of the respective output signals from the sequencing board of FIG. 5.

The blue slide valve signal terminates at 108 milliseconds and two milliseconds thereafter at 110 milliseconds, a two millisecond end of sequence pulse on line 328, is transferred to an auto cue counter 330 to end the sequencing.

The output on lines 320, 324, 326 and 302 from the light valve driver 300 operate the light valve solenoids at 115 volts DC. The 115 volt power is provided by an integral power supply, to be described in detail hereinafter. Optical isolation is achieved within the light valve driver unit 300 and therefore the output lines 320, 324, 326 for the color information and 302 for the vane signal are connected directly to the printer without additional isolation. An additional line 327 similarly provides 115 volt DC power to the fader.

Every time a vane signal is provided by the sequencer on line 310, it is transferred to the optical isolation interface 18 for recording on a cue signal counter on the printer itself so that the operator is constantly aware of the number of cue signals or color light changes that have been performed.

The sequencing of the sequencer 260 is initiated by either a sequence signal on line 332 from the tape control unit 112 of FIG. 3 or a vane open signal on line 334 from the fader, both of which are connected to an OR-gate 336. The OR-gate is connected by line 338 to a sequencer stop-start control unit 340. The start signal on line 338, when combined with a reader ready signal on line 33a starts the binary counter 304 counting by an output signal on line 344 from the start-stop control unit 340. The counter 304 then sequentially strobes the control data information from memory to the color light valves and at the end of sequence signal at 110 milliseconds along line 328 to the auto cue counter 330 provides a stop signal on line 350 to the start-stop control unit 340 to stop and reset the counter 304. The auto cue counter 330 is conditioned by the output on line 44 or 46 to determine whether or not the control tape is either a color tape or a composite tape. Additionally, the auto cue counter 330 is conditioned by the forward-reverse output signal on line 110 for operating the printer in either their forward or their reverse mode. The auto cue counter outputs an auto read signal along line 128 to the control logic unit 36 for initiating operation thereof. Additionally, the auto cue counter provides an auto cue counter signal on line 352 to the internal frame count cuer 12 for use as will be described in detail with respect to the internal frame count cuer 12. Lastly, a vane open signal on line 334 is transferred to a slide pulse disabling unit 354 which prevents the slide pulses from being transferred to the light valve driver which thereby permits actuation only of the light valve storage memory by the unlatch signal, which causes the light valve memory to store a maximum value which then transferred to the light valves permits for a wide open vane setting.

POWER SUPPLY

A single power supply unit 400, shown in the bottom left of FIG. 1, is utilized to provide a plurality of varying AC and DC output voltages to the printer control unit and the printer itself.

Figures 7, 9, 10:
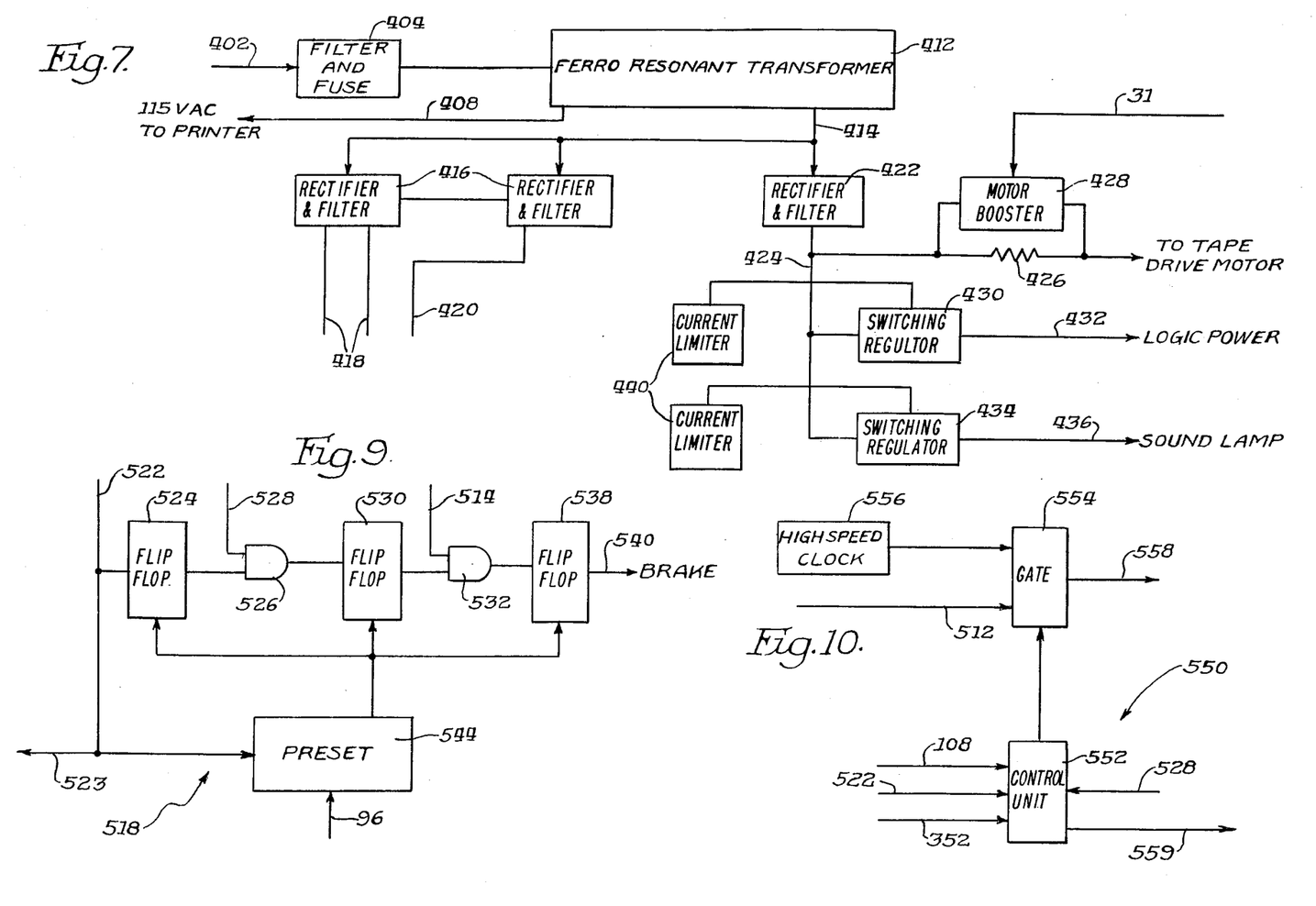
FIG. 7 is a schematic block diagram, in greater detail, of the power supply unit of FIG. 1.
FIG. 9 is a schematic block diagram, in greater detail, of the components of the reverse brake control unit of FIG. 1.
FIG. 10 is a schematic block diagram, in greater detail, of the internal components of the reverse counter preset unit of FIG. 1.

More particularly, the various components of the power supply unit 400 are illustrated in FIG. 7. The power supply unit 400 is adapted to use incoming power on line 402 between 95 and 260 volts AC with either 50 or 60 hertz single phase. Line 402 is connected to a filter and fuse 404 which is then connected directly to a transformer 412 which provides a plurality of taps for various unregulated voltage outputs. For example, output line 408 to the film printer provides an unregulated 115 volt AC current for driving the printer motors. The transformer 412 is a ferro-resonant transformer which provides a constant, regulated output voltage. The constant output AC voltage on line 414 is connected to a pair of rectifier and filter units 416 which provide both 115 and 125 volt DC output current on lines 418 and 420. The 115 volt DC current is connected to the light valve driver 300 for operating the light valve solenoids on the printer and the machine interface circuitry 18 while the 125 volt DC output current is used to bias the machine interface circuitry 18.

Another rectifier and filter unit 422 is connected by line 14 to the ferro-resonant transformer and provides a 24 volt DC output on line 424 for driving the tape motor within the tape reader 24. The tape drive motor is a commercially available four phase stepping motor which is used to drive the tape in the necessary increments determined by the tape format. A resistor 426 is provided in the line to the DC motor to reduce the voltage normally applied to the motor so as to partially energize the motor or bias the motor to hold the punched tape in a stationary position. A reader step command on line 31 is connected to a motor booster unit 428 which effectively shorts out the resistor 426 to apply the 24 volt DC current to the motor which thereby causes the motor to increment one step.

The 24 volt DC output line from the rectifier 422 also is connected to a first high efficiency switching regulator 430 which, by changing the duty cycle, provides a 5 volt DC output supply on line 432 to all of the logic circuitry. A second high efficiency switching regulator 434 provides an adjustable output voltage for operating the sound lamp on line 436. The sound lamp voltage may be selected within a 3 to 6 volt DC range for an incandescent sound lamp or between a 16 and 24 volt DC range for a tungsten-halogen sound lamp. Both of the switching regulators 430 and 434 are connected to a pair of over voltage and current limiting protection units 440 which act to limit output voltage in the event of a failure in either of the switching regulators.

LIGHT VALVE PROTECTION

Figure 8:
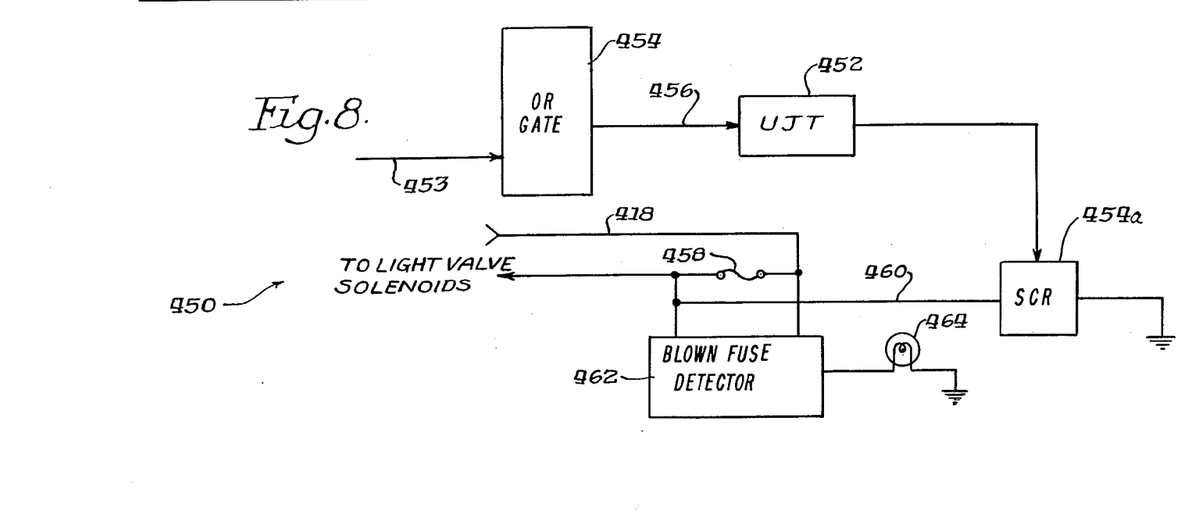
FIG. 8 is a schematic block diagram, in greater detail, of the light valve solenoid protection unit of FIG. 1.

As previous discussed, each of the light valves is operated by six solenoids at 115 volts DC current. If any of the solenoids are energized for a substantially long period of time this amount of power could easily cause one of the solenoids to overheat and burn out and possibly cause damage to other portions of the printer unit. Therefore, a light valve solenoid protection unit 450 is provided in order to shut down the solenoid circuitry in the event of some malfunction which has caused a solenoid to be energized. More particularly, the solenoid protection unit is shown in FIG. 8 and includes a unijunctional transistor type integrator to disable the light valve driver if the driver is energized for a period of over 200 milliseconds. As discussed previously with respect to the sequencing diagram of FIG. 6, the total elapsed time for completing one complete sequencing cycle is less than 112 milliseconds so that under normal operation all of the light valves can be set in less than 112 milliseconds.

An output line 453 carrying all of the light valve solenoids, slide, vane and fader signals from the light valve driver 300 is connected to an OR-gate 454 which permits all of the vane, unlatch and slide signals to be transferred via line 456 to the unijunction transistor 452. In the event of any malfunction, wherein the total time period for the sequencing exceeds 200 milliseconds, a trigger signal is output on line 452 and triggers a silicon controlled rectifier 454. The 115 volt DC line 418 which drives the light valve solenoids is connected by a fuse 458 to the silicon controlled rectifier 454. A trigger signal to the rectifier 454 completes a circuit between the 115 volt line through the fuse by connecting line 460 with the ground. This connection causes the fuse 458 to blow thus shutting down all the 115 volt DC current to the light valve solenoids. A blown fuse detector 462 senses that the fuse has blown and illuminates a fail lamp 464 to indicate to the operator that the fuse has been blown. The solenoid protection unit 450 thus prevents any damage to the light valve solenoids which could be caused by a malfunction within the light valve driver unit 300.

INTERNAL FRAME COUNT CUING SYSTEM

As previously described, the printer control unit 10 of the present invention is adapted to provide color changes in the film printer upon cuing signals provided by a notch or patch cuing system by signals along line 20 from the interface 18. Furthermore, the printer control unit 10 is capable of being used with an external frame count cuing system of the type described in copending patent application Ser. No. 509,590 filed Sept. 26, 1974 which has been included by reference in this application. Of course, when utilizing an external frame count cuing system of this type, it is necessary to provide a film address information tape for the external frame count cuer as well as a control data tape for the printer control unit 10.

However, it is desirable and more efficient to provide an internal frame count cuing system 12 within the printer control unit so as to permit use of a single composite tape for operating the photographic film printer. In the current embodiment, as shown in FIG. 1, the basic frame count cuing unit as shown in FIGS. 2 and 3 of the above mentioned application, Ser. No. 509,590 is represented by the designation "FCC unit 500", the details of which are not necessary for a complete understanding of the present application. However, that disclosure is incorporated by reference herein. Suffice it to say that the FCC unit 500 is substantially identical to FIGS. 2 and 3 of the above described application with the deletion of the counter resetting circuitry necessary for batch mode operation which is not provided by the internal frame count cuing unit 500. The batch mode capability is deleted in the present embodiment because most film developing laboratories presently do not utilize batch mode systems and a cost saving could be realized by its elimination.

The FCC unit 500 is connected to the data input line 31 by line 502 which provides film address information to the storage portion of the FCC unit 500. The data strobe signals are transferred from the control logic unit via line 160 to the FCC unit. The two downwardly directed output lines 506 on the FCC unit provide the display 508 with the memory and counter information to be digitally displayed to the operator.

The encoder 510 shown in the right of FIG. 1 is identical to the encoder shown in FIGS. 4, 5 and 6 of the above mentioned application. Briefly, the encoder provides a two phase output signal on line 512 which permits the direction sensing means to determine whether or not the film is being transported through the printer in the forward or reverse direction. The electronic components of the direction sensing means are shown in FIG. 7 of the prior application and the signals from the encoder, which are in a quadrature phase with one another, are combined to increment or decrement the counter for a forward or reverse direction respectively of the film transport sprocket. Also as previously described in the above mentioned application, a sync light signal from the encoder 510 is transferred via line 514 to a brake control unit 518 which will be described in detail below.

BRAKE CONTROL

The components of the brake control unit 518 are shown in more detail in FIG. 9. The brake control unit 518 is provided to enable the printer control unit 10 to automatically stop the film printer drive system so that the preprint or master film is in exact alignment with the sync hole in the printing aperture so as to enable the operator to immediately print from the same master film in the opposite direction. This feature will enable the operator of the printer to save a considerable amount of time which is involved when initially synchronizing the master film with the printing aperture. The brake control unit comprises a series of three flip-flops which time the sequential occurence of events at the end of a printing run. A first signal from the control logic unit on line 522 indicates that a stop eight hole has been read by the tape reader and outputs a signal on line 523 for machine deceleration. The first flip-flop 524 outputs to an AND-gate 526 which, when it receives a frame count cuing signal on line 528 from the FCC unit 500, triggers a second flip-flop 530. The output of the second flip-flop 530 is anded by gate 532 with the sync light signal from the encoder on line 514 to change the state of the final flip-flop 538. This final flip-flop 538 then provides a signal via line 540 through the interface 18 to actuate the brake on the film printer to thereby stop the film exactly on the sync frame. Operation of the lid switch light through line 96 energizes a preset 544 which automatically resets all of the flip-flops 524, 530 and 538. Similarly, an eight-hole punch on the control tape generates a signal on line 522 which will also reset the flip-flops.

REVERSE LOGIC

In normal forward printing operations, the counter unit of the FCC unit 500 begins at a zero reference and counts upwards as the film passes through the printer. However, in reverse operation, when operating in milestone mode, the counters of the FCC unit 500 must be preset with the last film frame address before counting downwardly during reverse printing operation. To this end, the printer control unit 10 is provided with a reverse counter preset unit 550 which enables the FCC unit counters to be preset with the last film frame address recorded on the control tape.

The reverse counter preset unit is shown in detail in FIG. 10. Line 108 signals a preset control unit 552 that the printer is set for the reverse mode operation. A signal from the sequencer 260 on line 352 to the control 552 causes gate 554 to steer simulated encoder pulses from a high speed clock 556 to line 558 to the FCC unit 500 which begins the counter operating in an up mode. Once the counter reaches a coincidence point with the information stored in memory for the final film frame address from the address control tape, a cue signal is generated on line 528 which, through the control unit 552, switches gate 554 to then steer the encoder signals directly to the FCC unit 500 through line 558. The start signal on line 522 from the control logic unit 36 is inhibited during the period of time in which the high speed clock 556 increments the counter. After the counters are preset, and the gate 554 switches the encoder 510 signals, the start signal is transferred via line 559 to the interface 18 and to the cue delay unit 124.

Rotation of the sprocket shaft then begins the FCC unit counters operating in a down mode. Since the counter began at a zero point, at the start of a reverse mode operation, the high speed clock signals simulate the signals generated by the encoder but at a much faster rate to cause the counter to reach the coincidence point in a very short period of time. Thus the output from a high speed clock provides a pair of signals in a quadrature phase relationship, which simulate the encoder rotating in the foward direction. Additionally, referring to FIG. 1, an auto reset line 560 and a manual reset line 562 provide a reset signal via line 564 to the FCC counters at initial startup of the machine automatically or manually when desired.

Figure 11:
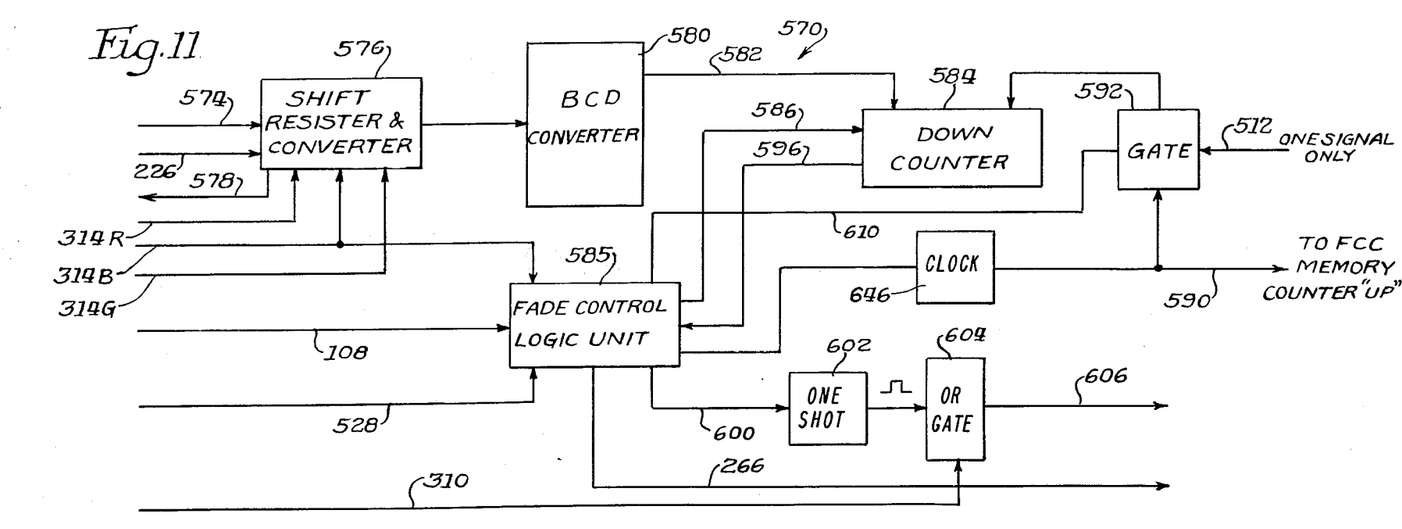
FIG. 11 is a schematic block diagram, in greater detail, of the reverse fade control logic unit as illustrated in FIG. 1.

In addition to presetting the counters for reverse operation as above described, in order to provide fading capabilities in a reverse mode, since all of the programmed fades begin with a cue signal, the execution of the same fade in a reverse mode must begin at a point which is offset from a cue signal film address. To achieve this, a reverse fade control logic unit 570 is provided to offset the memory so that the fade will begin to occur at a predetermined number of frames before the occurence of the same cue signal which would actuate the occurence of a fade in the forward direction. For example, when operating in the forward direction, a fadeout of 16 frames in length will normally begin at the occurence of a cue signal. However, during reverse operation of the printer a fade-in must be caused to occur at a point on the film 16 frames before that same cue signal is generated. FIG. 11 is a block diagram of the internal components of the reverse fade control unit 570. In forward operation, sequential fade data is transferred from the memory unit 80 via line 574 to a shift register and converter 576. if the printer is in the forward mode a signal on line 226 causes the fade data to be steered directly back to the light valve drivers 300 via line 578. However, when operating in the reverse mode, the fade data is processed by the reverse fade control unit 570 to provide initiation of the fade prior to the occurrence of the cue signal as described below.

The fade data is transferred by the shift register 576 to a fade length code converter 580 which converts the stored data into a binary coded decimal fade length number and outputs via line 582 to a down counter 584. At the occurrence of the slide blue signal on line 314b, at the end of a sequencing cycle, a fade control logic unit 585 conditioned by a valid reverse line 108, outputs a load signal on line 586 which causes the binary coded fade length data to be loaded into the down counter 584. The occurrence of the slide blue signal also enables a 20 kilo hertz clock 646 which outputs on line 590 to the FCC unit 500 to begin incrementing the memory and cause the down counter 584 to begin decrementing. Once the down counter reaches a zero count, a signal is output along line 596 to the reverse fade control logic unit 585 which then disables the clock 264. Thus the FCC memory has been advanced by the amount of the programmed fade length. Since the FCC memory is advanced by the fade length amount, an FCC cue signal is generated at a simulated position prior to its normal occurrence by the exact amount of the fade length.

The FCC cue signal on line 528 causes the fade control logic unit 585 to output a fade actuate signal on line 600 to a one shot 602 connected to an OR-gate 604. The OR-gate 604 outputs a fade actuate signal on line 606 to the machine interface 18 which then actuates the fade according to the stored information. In normal forward operation a vane signal on line 310 to the OR-gate 604 will initiate the fader.

Since the FCC memory was incremented by the fade length to cause the occurrence of initiation of a fade prior to the actual color change, it is necessary then to cause the generation of a cue signal after the fade has been accomplished. Therefore, the FCC cue signal on line 528 causes the fade control logic unit 585 to reload the down counter 584 and output a signal on line 610 from gate 592 transferring the encoder pulse to the down counter 584 to begin counting through the fade. After the fade length has been completed, the down counter again reaches a zero count and outputs along line 596 to the fade control logic unit 585 causing an output cue signal on line 266 to the cue delay unit 124 which then actuates the slide valves and color changes according to the stored information. In forward printing, the FCC cue on line 528 is transferred directly to line 266.

Therefore, the internal frame count cuer 12, in conjunction with the reverse counter preset unit 550, brake control unit 518, and the reverse fade control unit 570 provide the necessary conditioning or presetting of the FCC unit 500 in order to enable the photographic film printer to operate in a reverse mode using the same composite tape which is used for forward printing operations.

The present invention therefore provides a versatile control system for the operation of a photographic film printer. The control system is adapted to be used with either an external frame count cuing system or an integral frame count cuing system and additionally can operate using a conventional notch or patch type cuing system. A control element bearing control data information can be read by the control system while providing cue frame address information on a second tape to an external frame count cuing system. Additionally, a composite tape bearing both control data information and cuing frame address information can be read directly by the control system utilizing an internal frame count cuer for the actuation of the various control means. The control system also includes a control data memory for storing control information and a cue data memory for storing frame cue address information. Discrimination means are provided for determining whether the control element (i.e., control tape) contains only control information or both control information and cuing frame address information. The control unit includes enabling means providing an output command signal at a predetermined position of the preprint film to selectively enable actuation of the variable control means of the printer in accordance with the control information stored in the control data memory.

The internal frame count cuing portion of the control system provides for a reverse operation logic system for conditioning the unit with film frame address information when operating in the reverse mode. Complete bi-directional operation is provided and includes the capability of producing fades when operating in the reverse direction using the same control element. An integral power supply provides a plurality of output voltages for operating the control system and a sequencing means for actuation of the light valve solenoids over a period of time to reduce the power surge requirements for operating the light valves. A cue delay unit enables the opertor to delay the output command signal from the enabling means to a point in time later than the occurence of the actual cue signal. Finally, a brake control unit, which operates only in the reverse mode, automatically stops the preprint film on the sync frame, permitting easier and faster restarting of the printer in the forward mode.

The foregoing detailed description has been given for clearness of understanding only and no unnecessary limitations should be understood therefrom as some modifications will be obvious to those skilled in the art.

We claim:

1. A control system for controlling the operation of a photograhic film printer which includes variable control means for printing a preprint film onto raw stock, comprising:
information input means for providing either first data comprising control information or second data comprising control information and cuing frame address information;
control data memory means for storing said control information from said information input means for conditioning variable control means of said film printer;
cue data memory means for storing cuing frame address information from said information input means;
discriminating means for determining whether said information input means has provided said first or second data and for conditioning said control system in accordance therewith; and
enabling means providing an output command signal at a predetermined position of said preprint film in the printer to selectively enable actuation of said variable control means in accordance with control information stored in said control data memory means.

2. The control system of claim 1 wherein said enabling means includes an automatic cuing system which includes a counter means for continuously indicating film frame address information on said preprint film with respect to a predetermined reference position and comparator means for comparing the address information indicated by said counter means with a cuing address stored in said cue data memory for providing an output command signal upon the occurrence of a variable predetermined relationship therebetween.

3. The printer control unit of claim 2 including a direction detector connected to the film printer for conditioning the control unit for printing in a forward or reverse direction and a reverse counter preset logic means enabled by an output signal from said detector indicating that said printer is operating in a reverse direction, said reverse counter preset logic means presetting said counter means with the last cuing frame address information on said control element.

4. The control system of claim 1 wherein said enabling means includes a counter means for continuously indicating film frame address information on said preprint film with respect to a predetermined reference position and comparator means for comparing the address information indicated by said counter means with a cuing address stored in said cue data memory means from said second data provided by said information input means to provide an output signal upon the occurrence of a predetermined relationship between said counter and the information stored in said cue data memory means.

5. A control system for controlling the operation of a photographic film printer which includes variable control means for printing a preprint film onto raw stock, comprising:
information input means for providing either first data comprising control information or second data comprising control information and cuing frame address information;
control data memory means for storing said control information from said information input means for conditioning variable control means of said film printer;

cue data memory means for storing cuing frame address information from said information input means;

discriminating means for determining whether said information input means has provided said first or second data and for conditioning said control system in accordance therewith;

enabling means providing an output command signal at a predetermined position of said preprint film in the printer to selectively enable actuation of said variable control means in accordance with control information stored in said control data memory means, said enabling means including a counter means for continuously indicating film frame address information of said preprint film with respect to a predetermined reference position and comparator means for comparing the address information indicated by said counter means with a cuing address stored in said cue data memory means from said second data provided by said information input means to provide an output signal upon the occurrence of a predetermined relationship between said counter and the information stored in said cue data memory means; and manually presettable cue delay means associated with said enabling means permitting delaying of the cue signal thereto by a predetermined period of time to cause the occurrence of an output command signal at a point in time later than the occurrence of said cue signal.

6. The presettable cue delay means of claim 5 including a plurality of random access memories for storing cue delays associated with different operating speeds, directions of film transport, and modes of cue signal generation.

7. A control system for controlling the operation of a photographic film printer which includes variable control means for printing a preprint film onto raw stock, comprising:

information input means for providing either first data comprising control information or second data comprising control information and cuing frame address information;

control data memory means for storing said control information from said information input means for conditioning variable control means of said film printer;

cue data memory means for storing cuing frame address information from said information input means;

discriminating means for determining whether said information input means has provided said first or second data and for conditioning said control system in accordance therewith;

enabling means providing an output command signal at a predetermined position of said preprint film in the printer to selectively enable actuation of said variable control means in accordance with control information stored in said control data memory means, said enabling means including a counter means for continuously indicating film frame address information of said preprint film with respect to a predetermined reference position and comparator means for comparing the address information indicated by said counter means with a cuing address stored in said cue data memory means from said second data provided by said information input means to provide an output signal upon the occurrence of a predetermined relationship between said counter and the information stored in said cue data memory means; and transducer means for monitoring movement of said preprint film through said film printer, said transducer means providing output pulses to drive said counter means in accordance with the quantity of film being transported through the printer.

8. The control system of claim 7 including logic means responsive to said output control signal from said comparator means to advance said information input means to store additional first or second information into said memory means.

9. The control system of claim 7 wherein said discriminating means includes selector gate means responsive to the output of said information input means and conditioned thereby for selectively routing information to the appropriate memory means.

10. A control system for controlling the operation of a photographic film printer which includes variable control means for printing a preprint film onto raw stock, comprising:

information input means for providing either first data comprising control information or second data comprising control information and cuing frame address information;

control data memory means for storing said control information from said information input means for conditioning variable control means of said film printer;

cue data memory means for storing cuing frame address information from said information input means;

discriminating means for determining whether said information input means has provided said first or second data and for conditioning said control system in accordance therewith;

enabling means providing an output command signal at a predetermined position of said preprint film in the printer to selectively enable actuation of said variable control means in accordance with control information stored in said control data memory means; and isolation means to isolate the control system from said film printer to prevent inadvertent transfer of electrical signals to the control system.

11. The control system of claim 10 wherein the isolation means is an optical isolation system including a plurality of light emitting diodes coupled to a plurality of light sensitive transistors whereby signals are optically transferred to and from the control system and printer.

12. A control system for controlling the operation of a photographic film printer which includes variable control means for printing a preprint film onto raw stock, comprising:

information input means for providing either first data comprising control information or second data comprising control information and cuing frame address information;

control data memory means for storing said control information from said information input means for conditioning variable control means of said film printer;

cue data memory means for storing cuing frame address information from said information input means;

discriminating means for determining whether said information input means has provided said first or second data and for conditioning said control system in accordance therewith; and enabling means providing an output command signal at a predetermined position of said preprint film in the printer to selectively enable actuation of said variable control means in accordance with control information stored in said control data memory means, said enabling means including a counter means for continuously indicating film frame address information of said preprint film with respect to a predetermined reference position and comparator means for comparing the address information indicated by said counter means with a cuing address stored in said cue data memory means from said second data provided by said information input means to provide an output signal upon the occurrence of a predetermined relationship between said counter and the information stored in said cue data memory means, wherein the comparator means includes a programmable means for selectively varying the cuing frame address information stored in said cue data memory means to provide for the occurrence of a predetermined relationship between the cue data memory means and the counter means either in advance of or after the information originally stored in said cue data memory means.

13. An apparatus for controlling the operation of a photographic film printer in accordance with monitoring information, wherein the printer includes variable control means for printing a preprint film onto raw stock film, comprising:

reader means for reading a coded control element, said control element being adapted to provide first data comprising control information and second data comprising control and cuing frame address information;

discriminating means for determining whether said control element includes said first or said second data and for conditioning said control system in accordance therewith;

cuing frame address memory means for storing cuing frame address information from said control element;

control data memory means for storing said control information from said control element and for conditioning said variable control means in accordance therewith; and enabling means providing an output command signal at a predetermined position of said preprint film in the printer to selectively enable actuation of said variable control means in accordance with control information stored in said control data memory means.

14. The control system of claim 13 wherein said enabling means includes an automatic cuing system which includes a counter means for continuously indicating film frame address information on said preprint film with respect to a predetermined reference position and comparator means for comparing the address information indicated by said counter means with a cuing address stored in said cuing frame address memory means for providing an output command signal upon the occurrence of a variable predetermined relationship therebetween.

15. The control system of claim 14 wherein said enabling means includes a counter means for continuously indicating film frame address information on said preprint film with respect to a predetermined reference position and comparator means for comparing the address information indicated by said counter means with a cuing address stored in said cue data memory means from said second data provided by said information input means to provide an output signal upon the occurrence of a predetermined relationship between said counter and the information stored in said cue data memory means.

16. The control system of claim 15 including transducer means for monitoring movement of said preprint film through said film printer, said transducer means providing output pulses to drive said counter means in accordance with the quantity of film being transported through the printer.

17. The control system of claim 16 including logic means responsive to said output control signal from said comparator means to advance said reader means to store additional first or second information into said memory means.

18. The control system of claim 13 wherein said discriminating means includes selector gate means responsive to the output of said information input means and conditioned thereby for selectively routing information to the appropriate memory means.

19. The control system of claim 13 wherein said variable control means of the film printer includes a variable light source for controlling the color hue for exposure of the raw stock film and a fader for varying the intensity of the light exposing the film.

20. A control system for controlling the operation of a photographic film printer in accordance with monitoring information, wherein the printer includes variable control means and a signal generating encoder providing an output signal related to the quantity of film passing to the printer, comprising:

reader means for reading a coded control element, said control element comprising first data relating to control information or second data relating to cuing frame addresses and control information;

discriminating means for determining whether said control element includes cuing frame address information and for conditioning said control system in accordance therewith;

control data memory means for storing said control information and for conditioning variable control means of said film printer;

cue data memory means for storing cuing frame address information from said control element, said cue data memory means being enabled by said discriminating means upon the occurrence of identifying means on said control element indicating the presence of cuing frame address information on said control element; and enabling means providing an output command signal at a predetermined position of said preprint film in the printer to selectively enable actuation of said variable control means in accordance with said control information stored in said control data memory means.

21. The control system of claim 20 including a direction sensing means connected to the signal generator providing a first signal for film passing through the printer in the first direction and a second signal for film passing through the printer in a second direction, a counter unit connected to said direction sensing means for receiving said first and second signal from the direction sensing means to provide an incremental or decremental count of film passing through the printer, said direction sensing means and counter unit being enabled by said detection means upon the occurrence of cuing frame address information on said control element.

22. The control system of claim 21 including comparator means for comparing the information in said storage means with the count of said counter unit and providing said output signal to said printer upon the occurrence of a predetermined relationship between the storage means and said counter unit.

23. A control system for controlling the operation of a photographic film printer in accordance with monitoring information, wherein the printer includes variable control means and a signal generating encoder providing an output signal related to the quantity of film passing to the printer, comprising:
   reader means for reading a coded control element, said control element comprising first data relating to control information or second data relating to cuing frame addresses and control information;
   discriminating means for determining whether said control element includes cuing frame address information and for conditioning said control system in accordance therewith;
   control data memory means for storing said control information and for conditioning variable control means of said film printer;
   cue data memory means for storing cuing frame address information from said control element, said cue data memory means being enabled by said discriminating means upon the occurrence of identifying means on said control element indicating the presence of cuing frame address information on said control element;
   enabling means providing an output command signal at a predetermined position of said preprint film in the printer to selectively enable actuation of said variable control means in accordance with said control information stored in said control data memory means;
   direction sensing means connected to the signal generator providing a first signal for film passing through the printer in the first direction and a second signal for film passing through the printer in a second direction, a counter unit connected to said direction sensing means for receiving said first and second signal from the direction sensing means to provide an incremental or decremental count of film passing through the printer, said direction sensing means and counter unit being enabled by said detection means upon the occurrence of cuing frame address information on said control element;
   comparator means for comparing the information in said storage means with the count of said counter unit and providing said output signal to said printer upon the occurrence of a predetermined relationship between the storage means and said counter unit; and
   isolation means to isolate the apparatus from the film printer to prevent the inadvertent transfer of electrical signals.

24. The control system of claim 23 wherein the isolation means is an optical isolation system including a plurality of light emitting diodes coupled to a plurality of light sensitive transistors whereby signals from the control system are optically transferred to the printer and signals from the printer are optically transferred to the control system.

25. A control system for controlling the operation of a photographic film printer in accordance with monitoring information, wherein the printer includes variable control means and a signal generating encoder providing an output signal related to the quantity of film passing to the printer, comprising:
   reader means for reading a coded control element, said control element comprising first data relating to control information or second data relating to cuing frame addresses and control information;
   discrimination means for determining whether said control element includes cuing frame address information and for conditioning said control system in accordance therewith;
   control data memory means for storing said control information and for conditioning variable control means of said film printer;
   cue data memory means for storing cuing frame address information from said control element, said cue data memory means being enabled by said discriminating means upon the occurrence of identifying means on said control element indicating the presence of cuing frame address information on said control element;
   enabling means providing an output command signal at a predetermined position of said preprint film in the printer to selectively enable actuation of said variable control means in accordance with said control information stored in said control data memory means;
   direction sensing means connected to the signal generator providing a first signal for film passing through the printer in the first direction and a second signal for film passing through the printer in a second direction, a counter unit connected to said direction sensing means for receiving said first and second signal from the direction sensing means to provide an incremental or decremental count of film passing through the printer, said direction sensing means and counter unit being enabled by said detection means upon the occurrence of cuing frame address information on said control element; and
   comparator means for comparing the information in said storage means with the count of said counter unit and providing said output signal to said printer upon the occurrence or a predetermined relationship between the storage means and said counter unit, wherein said comparator means including a first programmable means for varying said information stored in said cue data memory means to provide for the occurrence of a predetermined relationship between the storage means and said counter unit in advance of or after the information received from said reader means.

26. In a control system for a photographic film printer of the type having a plurality of light vanes for selectively varying the intensity of a plurality of monochromatic light beams wherein each vane is selectively controlled by an actuation means operative in response to data signals from a suitable storage memory, an improvement comprising:

UNITED STATES PATENT OFFICE
CERTIFICATE OF CORRECTION

PATENT NO. : 4,045,136
DATED : August 30, 1977
INVENTOR(S) : Charles J. Watson and Larry L. Langrehr It is certified that error appears in the above-identified patent and that said Letters Patent are hereby corrected as shown below:

Column 22, line 16 (Claim 25, line 11), change "discrimination" to --discriminating--.

Column 22, line 52 (Claim 25, line 47), change "or" to --of--.

Signed and Sealed this

Twenty-second Day of May 1979

[SEAL]

Attest:

RUTH C. MASON
Attesting Officer

DONALD W. BANNER
Commissioner of Patents and Trademarks